United States Patent [19]

Lahav

[11] 4,455,226
[45] Jun. 19, 1984

[54] METHOD AND APPARATUS FOR TREATING THE SURFACE OF A BODY OF LIQUID

[75] Inventor: Noam Lahav, Palo Alto

[73] Assignee: Solmat Systems, Ltd., Yavne, Israel

[21] Appl. No.: 218,706

[22] Filed: Dec. 22, 1980

[51] Int. Cl.³ .............................................. E02B 15/00
[52] U.S. Cl. ...................................... 210/170; 405/22; 405/52; 422/43
[58] Field of Search ...................... 405/22, 52; 422/43; 427/345; 210/170

[56] References Cited

U.S. PATENT DOCUMENTS

| | | | |
|---|---|---|---|
| 2,349,787 | 5/1944 | Haswell | 422/43 |
| 2,878,098 | 3/1959 | Treloar et al. | |
| 3,184,789 | 5/1965 | Florey et al. | |
| 3,425,791 | 2/1969 | Koberg | |
| 3,431,063 | 3/1969 | Fox | |
| 3,458,274 | 7/1969 | Cashman et al. | |
| 3,528,764 | 9/1970 | Reiser | |

FOREIGN PATENT DOCUMENTS 348729 5/1931 United Kingdom.
898431 6/1962 United Kingdom.

Primary Examiner—Michael R. Losignan
Assistant Examiner—J. A. Bell
Attorney, Agent, or Firm—Sandler & Greenblum

[57] ABSTRACT

A method for treating a body of water forming a solar pond includes applying oil to the surface of the pond from at least one predetermined area of the surface, collecting oil from the surface, purifying the collected oil, and then recirculating the purified oil to said at least one predetermined area. Apparatus is provided for performing the method and includes wind-activated nozzles for applying the oil at an upwind peripheral location, a trough for collecting the oil at a downwind peripheral location, a filter for purifying the collected oil, color and spreadability sensors for examining the collected oil, and a quality improvement device for controlling the quality of the collected oil in accordance with the sensor output. A pump and pipe recirculate the treated oil from the trough to the nozzles.

16 Claims, 2 Drawing Figures

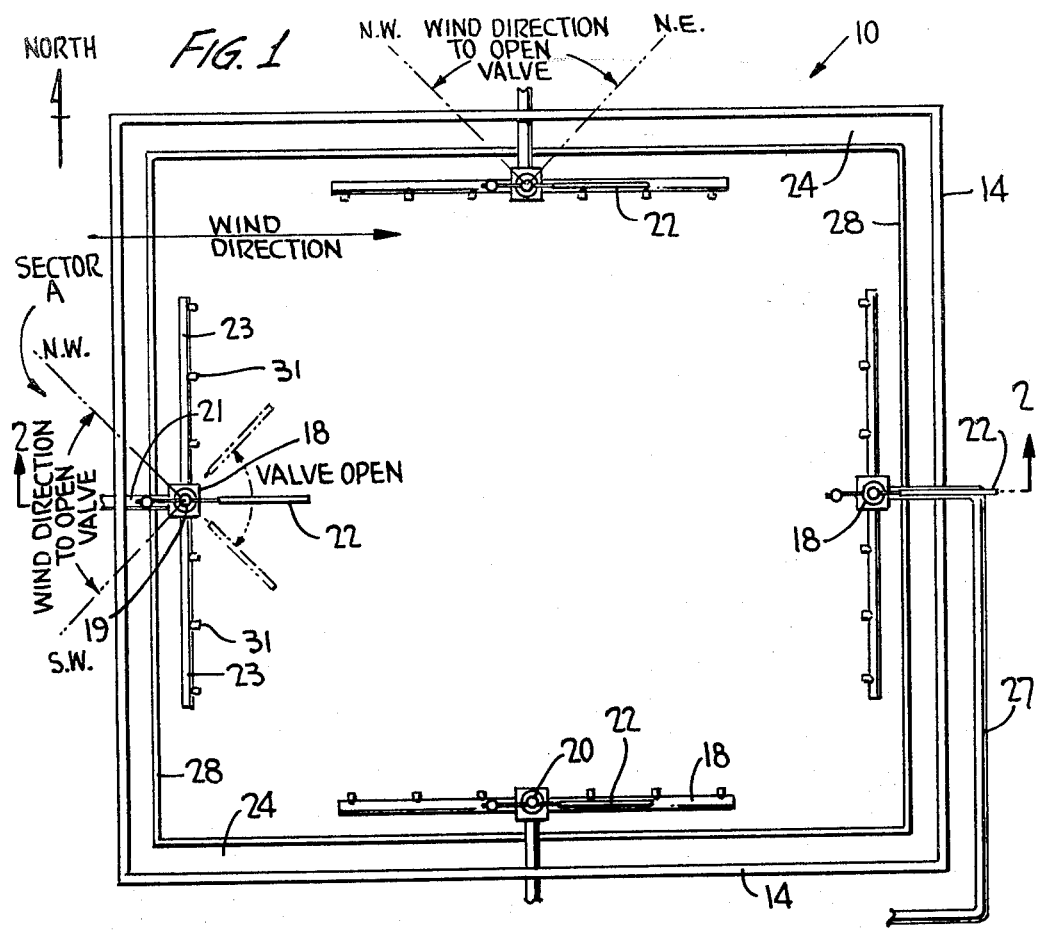
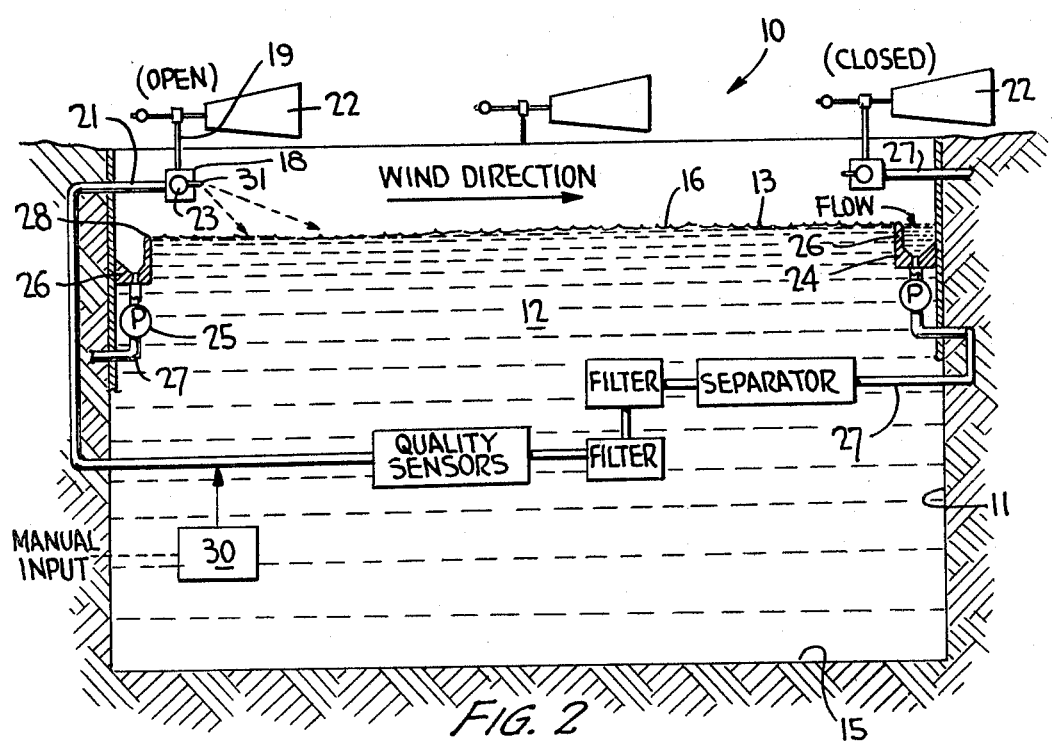

METHOD AND APPARATUS FOR TREATING THE SURFACE OF A BODY OF LIQUID

BACKGROUND OF THE INVENTION

1. Field of the Invention

The present invention generally relates to a method and apparatus for treating the surface of a body of liquid, and more specifically to a method and apparatus for treating the surface of a solar pond.

2. Discussion of Prior Art

Liquid evaporation is conventionally retarded by spreading paraffin oil on the surface of the liquid to form a static film that also inhibits wave formation.

British Pat. No. 348,729 discloses the use of an oil film on a reservoir for reducing heat loss through evaporation.

Reiser, U.S. Pat. No. 3,528,764, discloses apparatus for spraying oil on the surface of a body of water to retard evaporation and suppress wave formation. This apparatus comprises a spray or battery of sprays which are wind activated so that a film of oil placed on the water surface will always be applied on the upwind side. A change in wind direction moves the film downwind on the water surface and directs automatic spraying upwind of the new wind direction.

Treloar et al., U.S. Pat. No. 2,878,098, disclose apparatus for retarding evaporation from reservoirs or other water storage areas. The apparatus includes a plurality of posts driven into the bank of a water storage area which serve as anchors for wind operated valves which disperse a protective liquid onto the upper surface of the body of water.

Florey et al., U.S. Pat. No. 3,184,789, disclose apparatus for spraying a retardant such as a fatty alcohol on the surface of a body of water to reduce evaporation. Spray nozzles, regulated by solenoid-operated valves, which are in turn connected to a wind-operated switch, spray the retardant onto the water surface only when the wind is operative within a 90 degree arc, and are intermittently actuated to cause retardant to be applied to the liquid surface in short bursts.

British Pat. No. 898,431 discloses apparatus for establishing a suspension and/or emulsion of fatty alcohol and water for retarding water evaporation. The composition is dispersed by a sprayer in droplet form over the water, the wind direction being utilized to distribute the retardant in a desired direction.

Koberg, U.S. Pat. No. 3,425,791, discloses apparatus for distributing fatty alcohol on the surface of a reservoir to retard evaporation. The apparatus includes a control valve which is responsive to the rotation of a wind vane, and, accordingly, to changes in wind direction, in order to control the amount of suppressor liquid dispensed at predetermined intervals for appropriately covering the surface of the reservoir.

Fox, U.S. Pat. No. 3,431,063, discloses the utilization of hydrocarbon oils spread over a water surface in order to retard evaporation. Similarly, Cashman, U.S. Pat. No. 3,458,274, discloses the utilization of wax and hydrocarbon oil blends to be dispersed over the surface of an open reservoir to retard loss due to evaporation.

A basic problem with the conventional approaches described above is that they do not remove air-borne dust particles and other debris which collect on the film and float on the surface. In a solar pond environment, this situation is undesirable because the particles are either reflective and reduce the efficiency of the pond as a collector of solar radiation or absorb radiation at the interface where the heat is dissipated to the atmosphere by the convective nature of the windmixed layer at the surface.

Accordingly, it is a general object of the present invention to provide a new and improved method and apparatus for coating the surface of liquid with oil which overcomes or substantially reduces the problems associated with the prior art.

SUMMARY OF THE INVENTION

Briefly, the above and other objects, features and advantages of the present invention are provided for in one aspect thereof by applying oil to the surface of a body of liquid from at least one predetermined area of the surface, collecting the oil, purifying the collected oil, and recirculating the collected oil to said at least one predetermined area. By collecting the oil, wind-borne dust particles that are trapped in the film are removed from the surface of the liquid. Entrained particles may be removed from the collected oil, for example, by filtering; and the filtered oil is then recirculated to the predetermined area. This process is particularly well suited for application to a solar pond to suppress absorption by the pond of wind-borne particles that are constantly deposited on the surface. By reducing absorption of wind-borne particles, the upper levels of the pond will remain clear thus maintaining the efficiency of the pond in collecting solar radiation.

Preferably, the predetermined area to which the oil is applied is located on the upwind periphery of the body of liquid. As a consequence, the wind will not only spread the oil from the area to which it is applied across the surface of the liquid, but will serve to drive the oil into a collection trough on the downwind periphery of the body. By relating the predetermined area to which the oil is applied to the current wind direction, oil is constantly applied to the surface and constantly collected for filtering and reuse. This procedure serves to continuously flush particles from the surface of the body of liquid before they sink and are thus captured.

BRIEF DESCRIPTION OF THE DRAWINGS

An embodiment of the present invention is shown in the accompanying drawing wherein:

FIG. 1 is a perspective, schematic view of a solar pond which includes apparatus for retarding evaporation of a liquid contained therein; and FIG. 2 is a sectional view of the apparatus of FIG. 1.

DETAILED DESCRIPTION OF THE DRAWINGS

Referring more specifically to FIGS. 1 and 2, reference numeral 10 designates a solar pond located in excavation 11, the pond also representing a segregated region that can be located in an ocean, lake, reservoir, or other similar body of water. Thus, the pond could equally well comprise a lake, reservoir or similar liquid-containing natural area. The solar pond comprises a body of water 12 contained within a plurality of water impermeable walls 14 and bottom 15.

As is entirely conventional, the water in pond 10 has a halocline of 1–3 m in thickness located below a windmixed layer at the surface 13 of the pond some 20–50 cm deep, the lower portion of the pond constituting a heat storage layer of a depth that depends on the power or heating requirements imposed on the pond. In order to minimize evaporation of water from solar pond 10, and to retard and inhibit wave formation at surface 13, a thin layer 16 of oil is applied to surface 13 in a continuous fashion. As described below, the oil layer also serves to intercept wind-borne dust and other solid particles.

The oil applied to the surface is preferably prepared by adding a small amount of a conventional spreading agent to a hydrocarbon oil enabling the oil to form a thin, stable, and generally uniform film on the water surface. In order for the oil film to best accomplish its cleaning (of dust and other solid matter from the liquid surface) and retardant functions, the wind acting on the surface 13 of the pond is utilized to continuously move the oil over the surface of the water. Accordingly, a plurality of movable nozzle units 18 are provided on the periphery of the pond. To facilitate illustration, the pond is shown as being a relatively small square with a single nozzle unit 18 on each edge of the square. In a large scale pond of any shape, many nozzle units would be distributed along the periphery of the pond.

Each nozzle unit includes wind actuated valve 20 connected to input pipe 21 and to a pair of longitudinally extending headers 23, 23 containing a plurality of longitudinally spaced spray nozzles 31. Wind valve 22 rigidly attached to stem 19 of the valve controls the opening and closing of the valve. The arrangement is such that the vane opens the valve whenever the wind direction lies within a predetermined azimuthal quadrant as indicated in FIG. 1. For example, valve 20 associated with unit 18 on the left side of the pond, as shown in FIG. 1, would open only when the wind blows within sector A, which defines the NW-SW quadrant if *north* is in the direction indicated. All of the other valves in the other units would be closed. On the other hand, unit 18 at the top of the pond, as shown in FIG. 1, would be open only when the wind blows within the NW-NE quadrant, etc.

The nozzle units are positioned near the surface of the solar pond and about its entire periphery in order to take advantage of the direction of the current wind direction. Only the units upstream of the current wind direction will have their valves actuated by the wind so that the oil sprayed onto the water surface will be carried by wind action across the pond to the periphery thereof opposite to the periphery at which the spraying occurs.

Although nozzles are illustrated, other conventional means for applying oil to the pond are acceptable, as long as the oil application means cause the oil to drip either above or inside the water so that the drops will be relatively close and thereby coalesce into a uniform layer of oil on water surface 13. As examples, a conventional trickle irrigation system could be used in conjunction with an oil pump to force oil through trickle nozzles, or the provision of an hydraulic head of sufficient height.

As the wind spreads the oil across surface 13 from the activated nozzle unit toward the downwind periphery of the solar pond, the entire liquid surface of the pond will be covered. This retards evaporation of liquid 12, provides a calming influence on the upper surface to minimize wave formation and wind mixing, and carries dust and other accumulated particles which have gathered on the water surface towards the downwind side of the pond.

As illustrated in FIG. 2, an oil collection unit comprising sink(s) or trough(s) 24 and filters 26 is provided. The troughs or sinks can comprise a continuous and integral unit, as shown, or can be a number of independent units which surround the outer periphery of the contained liquid. As the spreading oil reaches the downwind periphery of the pond, propelled by the prevailing wind, a layer of oil/water passes over the interior wall 28 of trough 24 into its bottom. In FIG. 2, the wind direction is assumed to be from left-to-right, and the right-hand trough thus collects the oil spreading from left to right. Pumps 25, positioned adjacent the collecting troughs, are activated to transport the oil/water/particle material via first pipe 27 away from the troughs.

Each trough or sink 24 can join with the others as part of a monolithic structure to surround the entire periphery of the liquid within the solar pond, as shown in FIG. 1, or can be an independent unit. In the latter case, weirs can be used in order to channel the mobile oil/water layer toward the troughs. The precise location of the sites for the independent troughs depends upon the configuration and size of the solar pond or other body of water as well as upon the wind direction which carries the oil to the outer periphery of the pond or other enclosed liquid body. The collecting means need not be a trough, and could be, e.g., a pipe or tube positioned under the liquid surface adjacent to the center of the body of liquid.

Filters 26 can comprise a funnel or a coarse filter which separates macroscopic solid particles from the carrying liquid. Additionally, a conventional separator and/or filter(s) can be provided for removing water and smaller solid particles from the remaining oil and water combination.

At a later point along pipe 27, an inspection device or sensor(s) is provided for controlling the quality of the oil which is being conducted by the line. The quality sensor can be a conventional optical device for ascertaining the color of oil passing through pipe 27 or can merely be an operator making a color determination on his own without the aid of an external optical device. An oil spreadability sensor is also positioned at this point along line 27. This sensor can be, e.g., a mechanical means for tapping the line to extract a predetermined amount of oil and ascertain its spreadability by spreading it on a known surface of water. One manner of doing this is by placing the predetermined amount of oil in a petrie dish filled with water and determining the degree of its coverage and consistency.

After making the necessary determinations with the quality sensors, the quality of the oil is further controlled and improved by an oil reconstituter 30. This qulality corrector uses conventional means to reconstitute the oil such that it has desired properties. As one example, it can comprise means for an additive to be added to the oil prior to delivery to nozzles 18.

After being inspected by the sensors and reconstituted by correcting device 30, the oil passes through the piping system so that it is again ready to enter and be dispensed by nozzles 18, which are to be activated by vanes 22 and their corresponding valves 20. In this manner the oil application, collecting, purifying, controlling and recirculating system is unified into a continuous, generally closed circuit arrangement. This saves both oil and labor by having a closed, continuous operating system.

The apparatus of this system can be used to reduce the amount of evaporation of liquid 12 within the solar pond 10 or similar liquid containing area, to inhibit wave formation at and enhance dust interception along surface 13. The oil is forced through the trickle or other nozzles 18, spreads over the upper surface of the water to form a uniform and thin film as it is carried by the prevailing wind, and is conducted to collecting sites 24. The oil thus collected is then sucked by pump 25 and cleaned by filter 26 so that excess water and solid particles are removed from the oil. The oil is then checked for its quality by color and spreadability sensors, respectively, and reconstituted if necessary by quality improving device 30. The thus reconstituted oil is recirculated through the piping system towards the nozzles 18 so that it can again be dispensed onto water surface 13.

Such a continuous system and method results in a decrease in water evaporation, the removal of solid atmospheric particles, e.g. dust and plant residue, from the water by inhibiting their wetting and then conveying them to the collecting site, e.g., the troughs or tanks, and inhibits wave formation caused by wind, thereby greatly reducing the extent that the water in the upper layers adjacent to surface 13 is churned up.

The following examples of the system and method utilized are provided as non-limiting examples only:

EXAMPLE 1

Paraffin oil was mixed with linoleic acid which had been pretreated by heating at 95° C. for 12 days in the presence of air. This resulted in a 50:1 paraffin oil to acid ratio (volume). The oil mixed in this fashion was applied dropwise from two burettes onto the surface of water at one end of a 30×60 cm. plastic container. At the other end of the container a small trough comprising an elongated shallow box was placed into the water such that only the uppermost water layer adjacent the oil layer would enter the trough. The oil and water thus collected were pumped, collected and transferred into a separating funnel. Oil from the burettes was applied and spread over the available water surface, and air blown by a fan, together with a small hydraulic gradient created by dipping the trough to a predetermined depth, caused the oil to move from its area of application to the trough. From the trough the oil was pumped, together with some water, collected, separated by a separating funnel, and filtered through a 0.45 micron millipore, thereafter being used in the burette.

EXAMPLE 2

Paraffin spindle P/2 oil was mixed with safflower oil which had been pretreated by heating at 115° C. for four days in the presence of air to yield a 50:1 paraffin oil to safflower ratio (volume). The body of water comprised a 10×10 meter artificial pond having walls and a bottom which were covered by rubber sheets and which was filled with tap water to a depth of one meter. Conventional drip irrigation tubings were placed along the four walls of the pond, above the water surface, and had a trickle capacity of 2 liters per hour. The trickles were spaced at 50 cm. apart. A peristaltic pump was used to force the oil through the trickle nozzles onto the water surface, where the average total flow rate was 150 ml/min. The nozzles on two sides of the pond were always in operation, depending upon the wind direction. The oil covered the entire surface area of the pond to form a uniform thin layer which was detected by observation at an appropriate angle. The wind transported the oil across the pond to one of the pond corners, dependent upon the direction in which the oil was moved. The oil thus transported was then collected and transferred into separating funnels. After the bulk water was removed, the oil was filtered through a 0.45 micron millipore filter to maintain its spreadability. The system was operated for a continuous eight-hour peirod and served to drastically reduce waves and efficiently remove atmospheric solid particles, e.g. dust and/or organic debris. X-ray analysis of the dust filtered from the oil collected demonstrated that the mineralogical composition of the dust was similar to that of dust collected and used by dust collectors, thereby proving that solid inorganic particles found in the oil came from atmospheric dust. Evaporation reduction was measured as a function of the water level in the pond prior to and after the experiment. No change in water level was observed. The extent of evaporation in a control pond was 5 mm.

EXAMPLE 3

Hydrocarbon oil was prepared as in Example 2. A 50×30 meter artificial pond having its walls and bottom covered by rubber sheets was utilized, the pond comprising an artificial solar pond containing 80 cm. of saline water, the salinity being highest at the bottom and gradually decreasing to its lowest value at the top of the pond. Conventioanl drip irrigation tubings were placed along the walls, as in Example 2; the capacity of these trickle, however, was 4 liters per hour. An oil pump was utilized to pump oil through the trickle nozzle such that the average total flow rate was 700 ml/min. As in Example 3, the nozzles on two sides of the pond were always operating, dependent upon the wind direction. The oil then covered the entire upper surface of the pond to form a generally uniform and thin layer which could easily be detected by human observation at an appropriate angle; this observation was either unassisted or with the aid of a conventional optical device. The oil thereby collected was either filtered directly through filter paper or treated first by bleaching earth and then filtered. The thus purified oil did not suffer any decrease in its spreadability characteristics on water and required no further treatment. The dust interception and wave formation retardant capability of the oil fill was as described above with respect to Example 2. Evaporation and water loss, in comparison to the control body of liquid, was reduced to 42 percent of its original value.

Although the apparatus and method are illustrated and described with respect to solar pond 10, it is apparent that they are equally applicable to any body of water in which it is desired to inhibit or retard evaporation, reduce wave formation, and minimize dust and other foreign particle accumulation on the liquid surface.

From the foregoing description, one skilled in the art to which this invention pertains can easily ascertain the essential characteristics of the invention and, without departing from the spirit and scope thereof, can make various changes and modifications of the invention to adapt it to various usages and conditions.

What is claimed is:

1. Apparatus adapted to improve the characteristics of a body of liquid by reducing evaporation of said liquid, inhibiting liquid wave formation and cleaning dust and other particles from the surface of said liquid, said apparatus comprising:
   (a) means for applying oil onto the surface of said liquid from at least one predetermined area;
   (b) means for collecting said oil from said surface; and
   (c) means for recirculating said oil to said at least one predetermined area.

2. Apparatus in accordance with claim 1 further comprising means for purifying said oil and means for controlling the quality of said oil.

3. Apparatus in accordance with claim 2 wherein said body of liquid comprises a solar pond having a plurality of walls surrounding said liquid.

4. Apparatus in accordance with claim 2 wherein said means for applying oil comprise a plurality of selectively operable trickle nozzles positioned about the periphery of said pond.

5. Apparatus in accordance with claim 4 further comprising a vane positionable by wind and a valve operated by said vane for selectively operating each of said nozzles.

6. Apparatus in accordance with claim 2 wherein said collecting means comprise at least two independent collecting troughs.

7. Apparatus in accordance with claim 2 wherein said collecting means comprise a unitary trough surrounding said liquid.

8. Apparatus in accordance with claim 2 wherein said collecting means are located about the periphery of said body of liquid.

9. Apparatus in accordance with claim 2 further comprising at least one pump for pumping liquid from said collecting means into a pipe.

10. Apparatus in accordance with claim 2 wherein said collecting means includes a wall.

11. Apparatus in accordance with claim 2 wherein said purifying means comprise a filter for separating oil and water from solid particles and means for separating said oil from said water.

12. Apparatus in accordance with claim 2 wherein said means for controlling the quality of said collected oil comprise sensors and a quality improvement device.

13. Apparatus in accordance with claim 2 wherein said sensors comprise a color sensor and a spreadability sensor for checking the color and spreadability of said water, respectively.

14. Apparatus in accordance with claim 3 wherein said quality improvement device is adapted to reconstitute said oil if it is found to be deficient by said sensors.

15. Apparatus in accordance with claim 2 wherein said recirculating means comprise a pump and at least one pipe to transport said oil from said collecting means back to said nozzles.

16. Apparatus in accordance with claim 2 wherein said predetermined areas are located about the periphery of said body of liquid.

* * * * *